(12) United States Patent
Blumenstein

(10) Patent No.: US 10,604,090 B1
(45) Date of Patent: Mar. 31, 2020

(54) ACCESSORY POWER CENTER FOR VEHICLE

(71) Applicant: Mahindra N.A. Tech Center, Auburn Hills, MI (US)

(72) Inventor: Damon Blumenstein, Commerce Township, MI (US)

(73) Assignee: Mahindra N.A. Tech Center, Auburn Hills, MI (US)

( * ) Notice: Subject to any disclaimer, the term of this patent is extended or adjusted under 35 U.S.C. 154(b) by 0 days.

(21) Appl. No.: 16/245,629

(22) Filed: Jan. 11, 2019

(51) Int. Cl.
| | |
|---|---|
| *H05K 7/00* | (2006.01) |
| *B60R 16/03* | (2006.01) |
| *B60L 1/00* | (2006.01) |
| *H01H 85/153* | (2006.01) |
| *H01M 2/10* | (2006.01) |
| *H01R 25/00* | (2006.01) |

(52) U.S. Cl.
CPC .............. *B60R 16/03* (2013.01); *B60L 1/00* (2013.01); *H01H 85/153* (2013.01); *H01M 2/1077* (2013.01); *H01R 25/006* (2013.01)

(58) Field of Classification Search
USPC ..................................... 361/728; 315/77, 82
See application file for complete search history.

(56) References Cited

U.S. PATENT DOCUMENTS

| | | | | |
|---|---|---|---|---|
| 5,795,193 A | * | 8/1998 | Yang ..................... | H01R 9/2458 439/620.27 |
| 6,746,279 B1 | * | 6/2004 | Lopez .................. | H01R 9/2458 439/620.01 |
| 2018/0178858 A1 | | 6/2018 | Hollman et al. | |

OTHER PUBLICATIONS

Polaris Pulse™ Roof 6 Busbar; Item # 2882904; Polaris Engineered Parts, Accessories & Apparel; Polaris Industries, Inc.; Accessed Oct. 26, 2018. https://ranger.polaris.com/en-us/shop/accessories/roofs/2882904/.
Roof Power Kit Instruction—P/N 2882904; Polaris Engineered Parts, Accessories & Apparel; Polaris Industries, Inc. Instr. 9928186; Rev. 01; Aug. 2017. 7 Pages. https://cdnl.polaris.com/globalassets/pga/pdf/kitinstructions/ranger/shop/accessories/audio-and-tech/2882904_9928186r01.pdf?v=608f6cc2.

* cited by examiner

*Primary Examiner* — Hung S. Bui
(74) *Attorney, Agent, or Firm* — Harness, Dickey & Pierce, P.L.C.

(57) ABSTRACT

An accessory power center for a vehicle includes: a first terminal configured to be connected to a first reference potential of a battery of the vehicle; a second terminal configured to be connected to a second reference potential of the battery; and a fuse holder that includes: a first end that is electrically connected to the first terminal; and a second end. A first connector is configured to connect to a second connector of an accessory, the first connector including: a first electrical conductor that is electrically connected to the second end of the fuse holder; a second electrical conductor that is electrically connected to the second terminal; a third electrical conductor that is configured to receive power when backlights of the vehicle are powered; and a fourth electrical conductor that is configured to receive power when an ignition system of the vehicle is in an accessory state.

20 Claims, 4 Drawing Sheets

ACCESSORY POWER CENTER FOR VEHICLE

FIELD

The present disclosure relates to vehicles and more particularly to accessory power centers configured to be mounted to vehicles and to provide power to add-on vehicle accessories.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some types of vehicles include only an internal combustion engine that generates propulsion torque. Hybrid vehicles include both an internal combustion engine and one or more electric motors. Some types of hybrid vehicles utilize the electric motor and the internal combustion engine in an effort to achieve greater fuel efficiency than if only the internal combustion engine was used. Some types of hybrid vehicles utilize the electric motor and the internal combustion engine to achieve greater torque output than the internal combustion could achieve by itself. Electric vehicles include only one or more electric motors that generate propulsion torque.

SUMMARY

In a feature, an accessory power center for a vehicle is described. The accessory power center includes: a body member configured to be mounted to the vehicle; a first terminal configured to be connected to a first reference potential of a battery of the vehicle; a second terminal configured to be connected to a second reference potential of the battery of the vehicle; and a fuse holder that includes: a first end that is electrically connected to the first terminal; and a second end. The accessory power center further includes: a first connector configured to connect to a second connector of an accessory, the first connector including: a first electrical conductor that is electrically connected to the second end of the fuse holder; a second electrical conductor that is electrically connected to the second terminal; a third electrical conductor that is configured to receive power when backlights of the vehicle are powered; and a fourth electrical conductor that is configured to receive power when an ignition system of the vehicle is in an accessory state.

In further features, the first and second terminals are threaded stud terminals.

In further features, the fuse holder is a blade type fuse holder.

In further features, the accessory power center further includes: a fifth electrical conductor configured to receive power when the backlights of the vehicle are powered; and a second fuse holder that is connected between the fifth electrical conductor and the third electrical conductor.

In further features, the second fuse holder is a blade type fuse holder.

In further features, the accessory power center further includes: a sixth electrical conductor configured to receive a signal indicative of whether the ignition system of the vehicle is in the accessory state; and a relay configured to connect the first reference potential to the fourth electrical conductor when the sixth electrical conductor receives the signal indicative of the ignition system of the vehicle being in the accessory state.

In further features, the accessory power center further includes a third fuse holder that is connected between the relay and the fourth electrical conductor.

In further features, the accessory power center further includes: a third connector including: a fifth electrical conductor configured to receive power when the backlights of the vehicle are powered and that is electrically connected to the third electrical conductor via a second fuse holder; and a sixth electrical conductor configured to receive a signal indicative of whether the ignition system of the vehicle is in the accessory state.

In further features, the accessory power center further includes a relay configured to connect the first reference potential to the fourth electrical conductor when the sixth electrical conductor receives the signal indicative of the ignition system of the vehicle being in the accessory state.

In further features, the first connector is a sealed automotive grade connector.

In further features, the first connector includes at least one connector position assurance feature formed on an outer surface of the first connector.

In further features, the first connector is a water tight connector.

In further features, the second electrical conductor is directly electrically connected to the second terminal.

In further features, the accessory power center further includes at least one additional connector including electrical conductors connected in parallel with the first, second, third, and fourth electrical conductors.

In further features, the accessory power center further includes a third connector including: a fifth electrical conductor that is electrically connected to the second end of the fuse holder; a sixth electrical conductor that is electrically connected to the second terminal; a seventh electrical conductor that is configured to receive power when backlights of the vehicle are powered; and an eighth electrical conductor that is configured to receive power when the ignition system of the vehicle is in the accessory state.

In a feature, an accessory power center for a vehicle is described. The accessory power center includes: a first terminal configured to be connected to a first reference potential of a battery of the vehicle; a second terminal configured to be connected to a second reference potential of the battery of the vehicle; and N connectors that are electrically connected in parallel and that are configured to connect to vehicle accessories, each of the N connectors including: a first electrical conductor that is electrically connected to the first terminal; a second electrical conductor that is electrically connected to the second terminal; a third electrical conductor that is configured to be connected to a backlight circuit of the vehicle; and a fourth electrical conductor that is configured to be connected to an ignition system of the vehicle. N is an integer greater than one.

In further features, the accessory power center further includes N first fuse holders connected between the first terminal and the N first electrical conductors.

In further features, the accessory power center further includes: a fifth electrical conductor configured to be connected to the backlight circuit; and a second fuse holder connected between the fifth electrical conductor and the N third electrical conductors.

In further features, the accessory power center further includes: a sixth electrical conductor configured to be connected to the ignition system of the vehicle; and N third fuse holders connected between the sixth electrical conductor and the N fourth electrical conductors.

In further features, the accessory power center further includes a relay configured to selectively connect the first reference potential to the fourth electrical conductor.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Some vehicle accessories may be hard wired to the vehicle by a vehicle manufacturer. Other types of vehicle accessories can be added on to the vehicle, such as windshield wipers, heating ventilation and air conditioning (HVAC) units, winches, light bars, sound bars, etc.

According to the present application, an accessory power center can be mounted to and electrically connected to the vehicle to provide power to add-on accessories. The accessory power center includes electrical connectors to which the add-on accessories can be connected. The accessory power center includes fuse holders for connection of fuses to prevent accessories from experiencing over-current. A relay may also be implemented to apply power to the electrical connectors (and therefore any connected add-on accessories) when an ignition system of the vehicle is in an accessory state. The connectors also supply backlight power for add-on accessories having backlights, such as back lit switches. The backlighting may help users better utilize add-on accessories having backlight items under some circumstances, such as under low light conditions.

Figure 1:
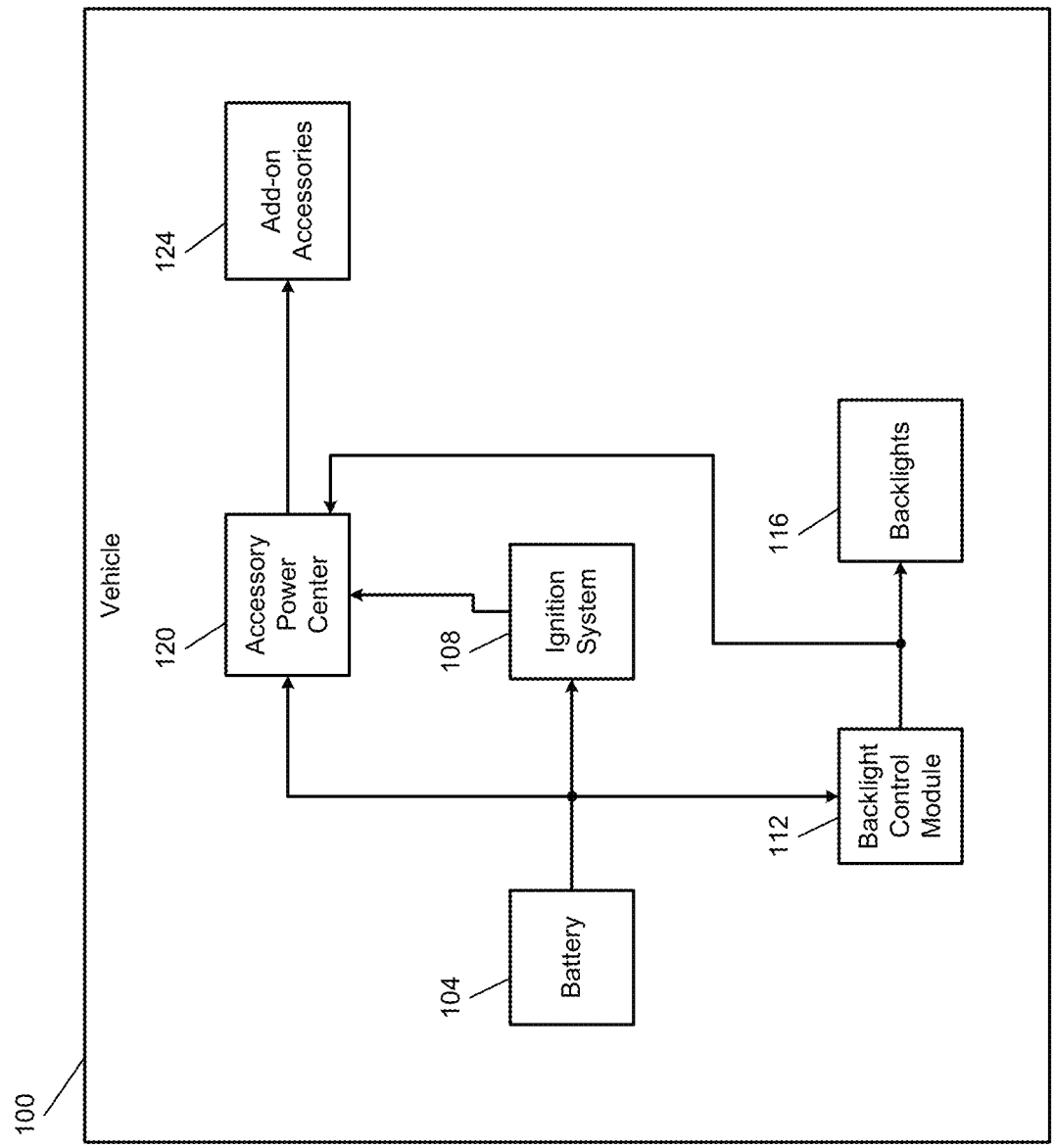
FIG. 1 is a functional block diagram of an example vehicle.

FIG. 1 is a functional block diagram of an example vehicle 100. The vehicle includes a battery 104 and an ignition system 108. The battery 104 may be a single battery or two or more batteries, such as a battery pack. The ignition system 108 selectively provides power from the battery 104 to one or more internal combustion engines and/or one or more electric motors of the vehicle 100. The internal combustion engine(s) and/or the electric motor(s) propel the vehicle 100. The vehicle 100 may be, for example, a vehicle designed for use on roads, an off road vehicle (ORV), a utility vehicle, a boat, an airplane, a snowmobile, a jet ski, or another suitable type of vehicle.

The ignition system 108 provides power when an ignition key is in an on state. The ignition system 108 does not provide power when the ignition key is in an off state. Power may be provided to originally installed vehicle accessories (e.g., a radio) from the battery 104 when the ignition key is in an accessory state. While the example of an ignition key based system is described, one or more buttons and/or switches may be used or another suitable system may be used.

A backlight control module 112 controls the application of power from the battery 104 to one or more backlights 116 of the vehicle 100. The backlights 116 may be, for example, backlights of gauges, accent lighting, and/or other types of backlights.

An accessory power center 120 can be attached to the vehicle 100, such as behind an instrument panel of the vehicle 100, under a hood of the vehicle 100, or in another suitable location. The accessory power center 120 is connected to the battery 104 and is configured to provide power to one or more add-on accessories 124 electrically connected to the accessory power center 120 from the battery 104 when the ignition key is in the on state and when the ignition key is in the accessory state. The accessory power center 120 is also configured to provide backlight power to accessory lights (e.g., back lit switches) of the add-on accessories 124 when the backlights 116 are on. Examples of the add-on accessories 124 include, but are not limited to, heating, ventilation, and air conditioning (HVAC) units, air conditioning (A/C) units, windshield wiper systems, winches, sound bars, and light bars.

Figure 2:
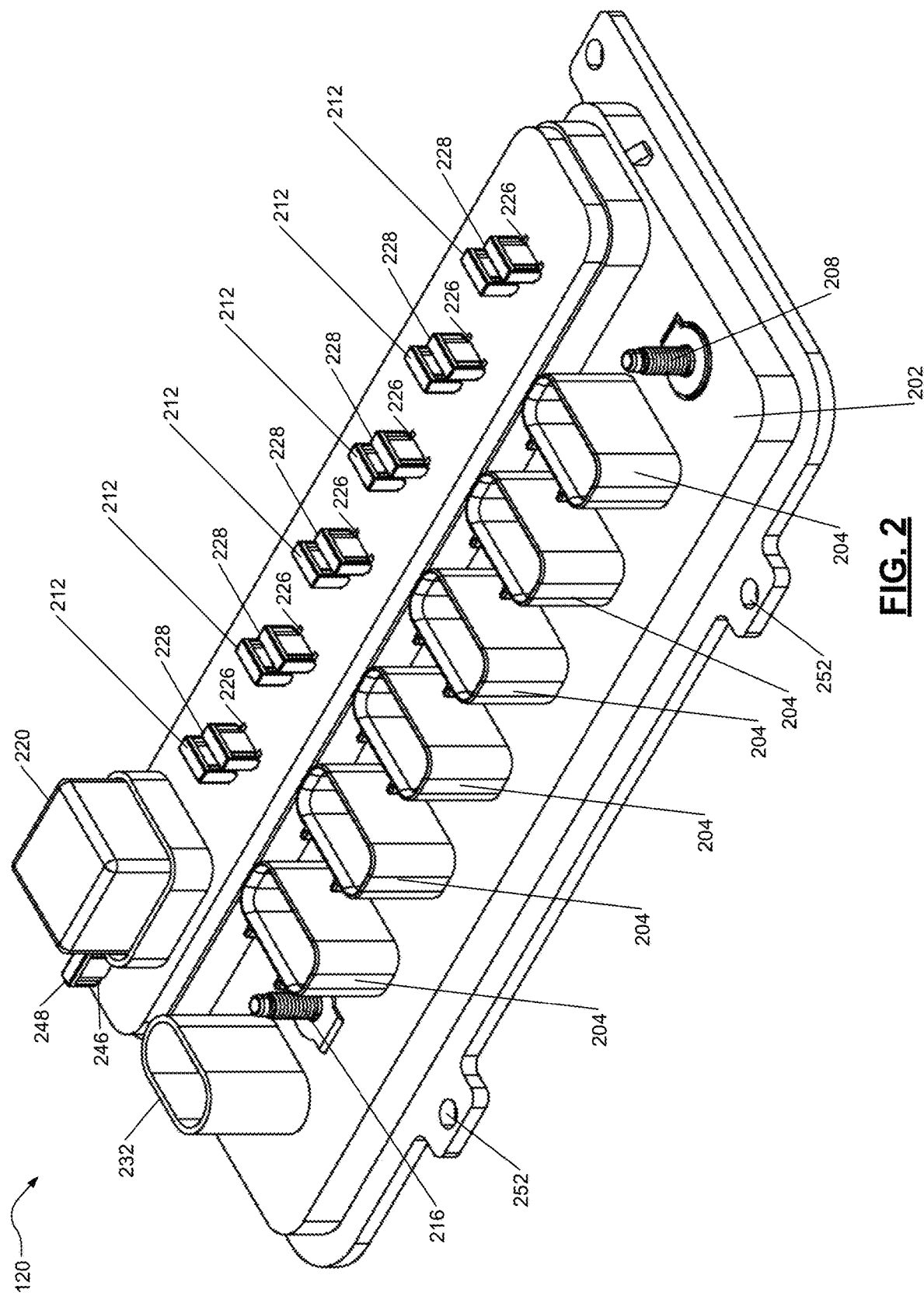
FIGS. 2 and 3 are front-side and back-side perspective views of example implementations of an accessory power center.
Figure 3:
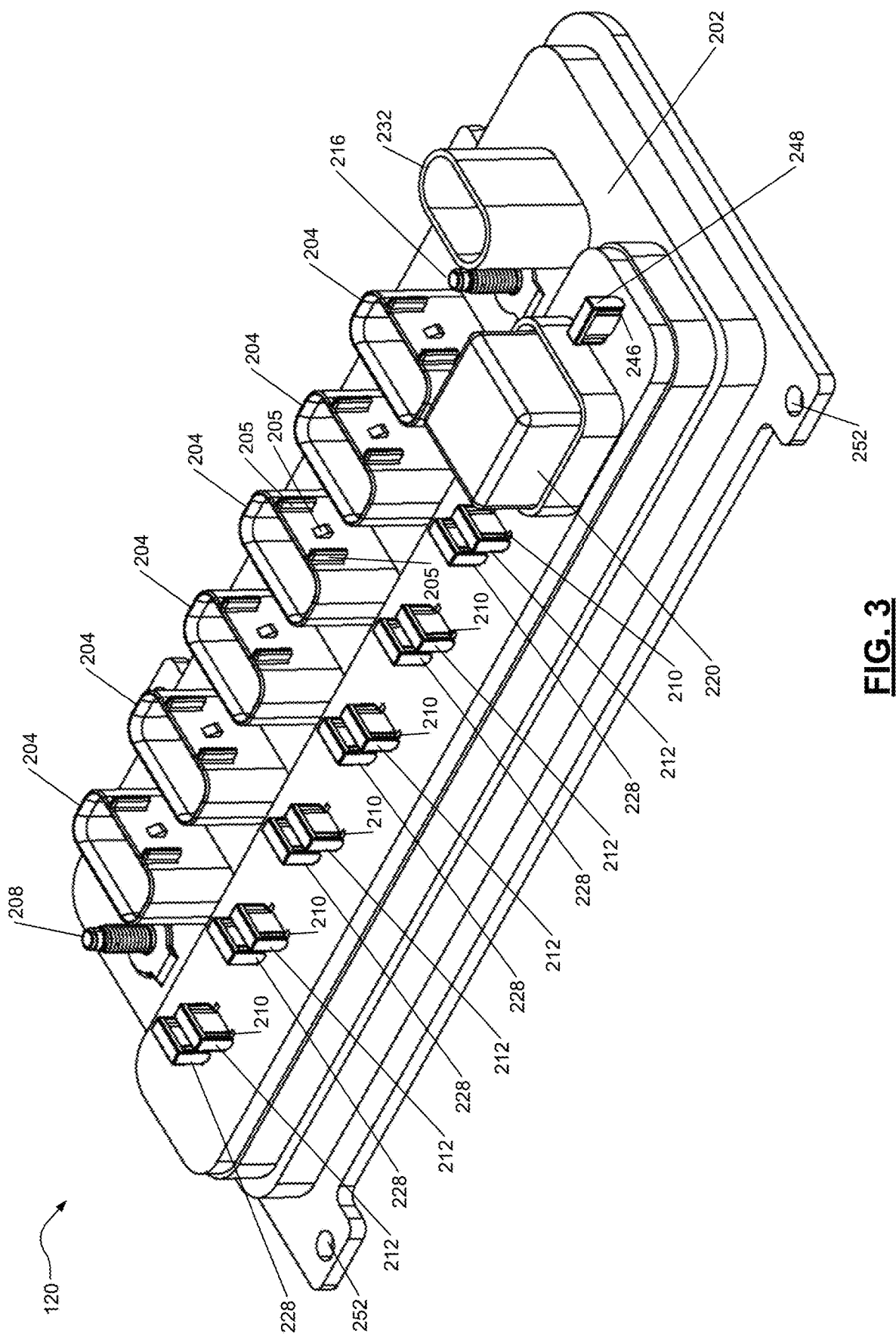
Figure 4:
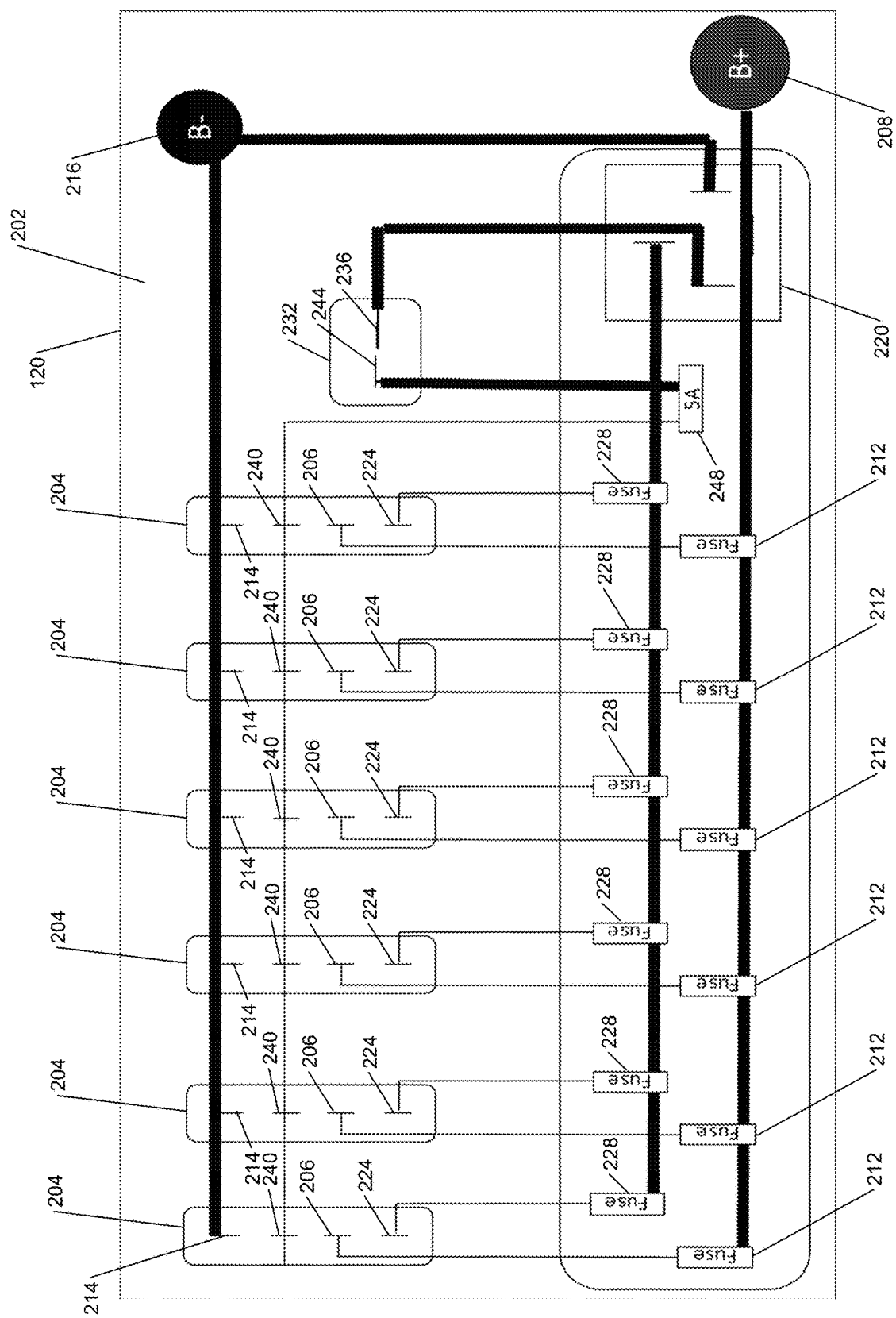
FIG. 4 is an example electrical schematic of an accessory power center.

FIGS. 2 and 3 include perspective views of an example implementation of the accessory power center 120. FIG. 4 includes a schematic of example electrical connections of the accessory power center 120.

The accessory power center 120 includes a body member 202 and a plurality of connectors 204. The body member 202 may be, for example, a plastic or another suitable type of electrically insulating (or isolating) material. While the example of 6 of the connectors 204 is shown, the accessory power center 120 may include more or fewer of the connectors 204.

Each of the connectors 204 includes 4 electrical conductors (e.g., blade type, 2.8 mm or 1.5 mm), such as male type electrical conductors or female type electrical conductors. For example only, the connectors 204 may be male type 4 pin connectors or another suitable type of connector. The connectors 204 may be water tight (sealed) or non-water tight. The connectors 204 are automotive grade connectors. In various implementations, caps may cover the connectors 204, respectively. The cap of one of the connectors 204 may be removed to allow connection of one of the add-on accessories 124 to that one of the connectors 204. the connectors 204 may include one or more connector position assurance features 205 formed on the outer surfaces of the connectors 204. The connector position assurance features 205 may help assure proper positioning and electrical connection with connectors of the add-on accessories 124.

A first one of the electrical conductors 206 of each of the connectors 204 is connected to a positive reference potential of the battery 104 via a first electrical conductor 208. The first electrical conductor 208 may be, for example, a threaded stud terminal or another type of electrical conductor.

Fuse holders 210 and fuses 212 are connected between the first electrical conductor 208 and the first electrical conductors 206 of the connectors 204. The fuses 212 are disconnectable from the fuse holders 210 and are replaceable. The fuses 212 may be, for example, 5 amp, 10 amp, or 15 amp fuses or have another suitable rating. The fuses 212 may be, for example, automotive blade type fuses (e.g., ATC) or another suitable type of fuse. The fuses 212 may or may not be provided with the accessory power center 120. For example only, the fuses 212 may be provided with the add-on accessories 124 such that the fuses 212 have current ratings that are specific to the add-on accessories 124, respectively. The fuse holders 210 are configured to receive the fuses 212 and may be, for example, blade type fuse holders.

A second one of the electrical conductors 214 of each of the connectors 204 is connected to a negative (or ground) reference potential of the battery 104 via a second electrical conductor 216. The second electrical conductor 216 may be, for example, a threaded stud terminal or another type of electrical conductor. The second electrical conductor 216 may be directly connected to the second electrical conductors 214 of the connectors 204.

The accessory power center 120 also includes a relay 220. The relay 220 connects a third one of the electrical conductors 224 of each of the connectors 204 to the first electrical conductor 208 when the ignition key is in the accessory state or the on state. For example, a control terminal of the relay 220 may be connected to the ignition system 108 and actuate the relay 220 based on the state of the ignition system 108. When the ignition key is in the off state, the relay 220 connects the third electrical conductors 224 of each of the connectors 204 to the second electrical conductor 216.

Fuse holders 226 and fuses 228 are connected between the first electrical conductor 208 and the third electrical conductors 224 of the connectors 204. The fuses 228 are disconnectable from the fuse holders 226 and are replaceable. The fuses 228 may be, for example, 5 amp, 10 amp, or 15 amp fuses or have another suitable rating. The fuses 228 may be, for example, automotive blade type fuses (e.g., ATC) or another suitable type of fuse. The fuses 228 may or may not be provided with the accessory power center 120. For example only, the fuses 228 may be provided with the add-on accessories 124 such that the fuses 228 have current ratings specific to the add-on accessories 124, respectively. The fuse holders 226 are configured to receive the fuses 228 and may be, for example, blade type fuse holders.

The accessory power center 120 includes a connector 232. The connector 232 includes 2 electrical conductors (e.g., blade type, 6.3 mm or 6.5 mm), such as male type electrical conductors or female type electrical conductors. For example only, the connector 232 may be a male type 2 pin connectors or another suitable type of connector. The connector 232 may be water tight (sealed) or non-water tight. The connector 232 is an automotive grade connector.

A first conductor 236 of the connector 232 is connected to the control terminal of the relay 220. The first conductor 236 of the connector 232 can be connected to the ignition system 108 via a complementary electrical connector and wiring harness that is connected to the ignition system 108.

A fourth one of the electrical conductors 240 of each of the connectors 204 is connected to a second electrical conductor 244 of the connector 232. A fuse holder 246 and a fuse 248 is connected between the second electrical conductor 244 and the fourth electrical conductors 244 of the connectors 204. The fuse 248 is disconnectable and is replaceable. The fuse 248 may be, for example, a 5 amp fuse or have another suitable rating. The fuse 248 may be, for example, an automotive blade type fuse (e.g., ATC) or another suitable type of fuse. The fuse holder 246 may be a blade type fuse holder or another suitable type of fuse holder.

The second electrical conductor 244 of the connector 232 can be connected to receive power from the backlight control module 112. The second electrical conductor 244 of the connector 232 can be connected to the backlight control module 112 via the complementary electrical connector and the wiring harness. When the backlight control module 112 is outputting power and lighting the backlights 116, a positive reference potential is present at the fourth electrical conductors 240. When one of the add-on accessories 124 is connected to one of the connectors 204, the fourth electrical conductor 240 of that one of the connectors 204 provides power to the one of the add-on accessories 124, such as to the backlight of a switch of the one of the add-on accessories 124.

In various implementations, the accessory power center 120 may include a cover that covers the fuses 212, the fuses 228, the relay 220, and the fuse 248. The cover may be water tight or non-water tight.

The body member 202 is configured to be mounted to the vehicle 100. For example, the body member 202 may include one or more apertures 252 for screws or bolts that secure the body member 202 to the vehicle. While the example of the apertures 252 is shown, the body member 202 may alternatively be mounted to the vehicle via one or more adhesives, mounted to the vehicle 100 via one or more clips, or configured to mount to the vehicle in another suitable manner.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An accessory power center for a vehicle, comprising:
   a body member configured to be mounted to the vehicle;
   a first terminal configured to be connected to a first reference potential of a battery of the vehicle;
   a second terminal configured to be connected to a second reference potential of the battery of the vehicle;
   a fuse holder that includes:
      a first end that is electrically connected to the first terminal; and
      a second end;
   a first connector configured to connect to a second connector of an accessory, the first connector comprising:
      a first electrical conductor that is electrically connected to the second end of the fuse holder;
      a second electrical conductor that is electrically connected to the second terminal;
      a third electrical conductor that is configured to receive power when backlights of the vehicle are powered; and
      a fourth electrical conductor that is configured to receive power when an ignition system of the vehicle is in an accessory state.

2. The accessory power center of claim 1 wherein the first and second terminals are threaded stud terminals.

3. The accessory power center of claim 1 wherein the fuse holder is a blade type fuse holder.

4. The accessory power center of claim 1 further comprising:
   a fifth electrical conductor configured to receive power when the backlights of the vehicle are powered; and
   a second fuse holder that is connected between the fifth electrical conductor and the third electrical conductor.

5. The accessory power center of claim 4 wherein the second fuse holder is a blade type fuse holder.

6. The accessory power center of claim 1 further comprising:
   a sixth electrical conductor configured to receive a signal indicative of whether the ignition system of the vehicle is in the accessory state; and
   a relay configured to connect the first reference potential to the fourth electrical conductor when the sixth electrical conductor receives the signal indicative of the ignition system of the vehicle being in the accessory state.

7. The accessory power center of claim 6 further comprising a third fuse holder that is connected between the relay and the fourth electrical conductor.

8. The accessory power center of claim 1 further comprising:
   a third connector comprising:
      a fifth electrical conductor configured to receive power when the backlights of the vehicle are powered and that is electrically connected to the third electrical conductor via a second fuse holder; and
      a sixth electrical conductor configured to receive a signal indicative of whether the ignition system of the vehicle is in the accessory state.

9. The accessory power center of claim 8 further comprising a relay configured to connect the first reference potential to the fourth electrical conductor when the sixth electrical conductor receives the signal indicative of the ignition system of the vehicle being in the accessory state.

10. The accessory power center of claim 1 wherein the first connector is a sealed automotive grade connector.

11. The accessory power center of claim 1 wherein the first connector includes at least one connector position assurance feature formed on an outer surface of the first connector.

12. The accessory power center of claim 1 wherein the first connector is a water tight connector.

13. The accessory power center of claim 1 wherein the second electrical conductor is directly electrically connected to the second terminal.

14. The accessory power center of claim 1 further comprising at least one additional connector including electrical conductors connected in parallel with the first, second, third, and fourth electrical conductors.

15. The accessory power center of claim 1 further comprising a third connector comprising:
   a fifth electrical conductor that is electrically connected to the second end of the fuse holder;
   a sixth electrical conductor that is electrically connected to the second terminal;
   a seventh electrical conductor that is configured to receive power when backlights of the vehicle are powered; and
   an eighth electrical conductor that is configured to receive power when the ignition system of the vehicle is in the accessory state.

16. An accessory power center for a vehicle, comprising:
   a first terminal configured to be connected to a first reference potential of a battery of the vehicle;
   a second terminal configured to be connected to a second reference potential of the battery of the vehicle; and
   N connectors that are electrically connected in parallel and that are configured to connect to vehicle accessories, each of the N connectors including:
      a first electrical conductor that is electrically connected to the first terminal;
      a second electrical conductor that is electrically connected to the second terminal;
      a third electrical conductor that is configured to be connected to a backlight circuit of the vehicle; and
      a fourth electrical conductor that is configured to be connected to an ignition system of the vehicle,
   wherein N is an integer greater than one.

17. The accessory power center of claim 16 further comprising N first fuse holders connected between the first terminal and the N first electrical conductors.

18. The accessory power center of claim 17 further comprising:
   a fifth electrical conductor configured to be connected to the backlight circuit; and
   a second fuse holder connected between the fifth electrical conductor and the N third electrical conductors.

19. The accessory power center of claim 18 further comprising:
   a sixth electrical conductor configured to be connected to the ignition system of the vehicle; and
   N third fuse holders connected between the sixth electrical conductor and the N fourth electrical conductors.

20. The accessory power center of claim 19 further comprising a relay configured to selectively connect the first reference potential to the fourth electrical conductor.

* * * * *